(12) United States Patent
Daandels et al.

(10) Patent No.: US 12,054,258 B2
(45) Date of Patent: Aug. 6, 2024

(54) WING FOR AN AIRCRAFT AND CONNECTING ASSEMBLY TO MOVABLY CONNECT A SLAT TO A MAIN WING

(71) Applicant: Airbus Operations GmbH, Hamburg (DE)

(72) Inventors: Dort Daandels, Bremen (DE); Bernhard Schlipf, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 227 days.

(21) Appl. No.: 17/615,071

(22) PCT Filed: Jul. 10, 2020

(86) PCT No.: PCT/EP2020/069594
§ 371 (c)(1),
(2) Date: Nov. 29, 2021

(87) PCT Pub. No.: WO2021/009060
PCT Pub. Date: Jan. 21, 2021

(65) Prior Publication Data
US 2022/0219805 A1    Jul. 14, 2022

(30) Foreign Application Priority Data

Jul. 12, 2019   (DE) .......................... 102019119023.1

(51) Int. Cl.
*B64C 9/22*     (2006.01)
*B64C 9/02*     (2006.01)

(52) U.S. Cl.
CPC . *B64C 9/22* (2013.01); *B64C 9/02* (2013.01)

(58) Field of Classification Search
CPC .................................... B64C 9/22; B64C 9/02
See application file for complete search history.

(56) References Cited

U.S. PATENT DOCUMENTS 2,938,680 A   5/1960   Greene et al.
3,272,458 A   9/1966   Bracka
(Continued)

FOREIGN PATENT DOCUMENTS

| EP | 3395679 A1 | 10/2018 |
| WO | 2018197265 A1 | 11/2018 |
| WO | 2018197649 A1 | 11/2018 |

OTHER PUBLICATIONS

International Search Report; priority document.
German Search Report; priority document.

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

A wing for an aircraft, including a main wing, a slat, and a connecting assembly movably connecting the slat to the main wing, the slat being movable between retracted and extended positions. The connecting assembly includes a slat track and a roller bearing. A front section of the slat track is mounted to the slat. A rear section and an intermediate section of the slat track are mounted to the main wing via the roller bearing. The roller bearing includes a guide rail mounted to the main wing and a first roller which is rotatably mounted to the rear section of the slat track. The first roller engages a first engagement surface formed by the guide rail. The roller bearing includes a second roller which is rotatably mounted to the main wing. The second roller engages a second engagement surface formed by the intermediate section of the slat track. The first engagement surface comprises a first section, which is straight or is curved with a first radius of curvature and a first center of curvature, and the second engagement surface comprises a second section, which is straight or is curved with a second radius of curvature and a second center of curvature. When both the (Continued)

first section and the second section are curved, the first center of curvature and the second center of curvature are spaced from each other.

10 Claims, 8 Drawing Sheets

(56) References Cited

U.S. PATENT DOCUMENTS

| | | | | |
|---|---|---|---|---|
| 4,650,140 | A * | 3/1987 | Cole | B64C 9/24 |
| | | | | 244/214 |
| 2018/0312244 | A1 | 11/2018 | Bensmann | |
| 2019/0283863 | A1* | 9/2019 | Bowers | B64C 9/16 |
| 2020/0122819 | A1 | 4/2020 | Schlipf et al. | |
| 2020/0148331 | A1 | 5/2020 | Bensmann | |
| 2020/0290722 | A1* | 9/2020 | Tsai | B64C 9/02 |

* cited by examiner

WING FOR AN AIRCRAFT AND CONNECTING ASSEMBLY TO MOVABLY CONNECT A SLAT TO A MAIN WING

CROSS-REFERENCES TO RELATED APPLICATIONS

This application claims the benefit of the International Application No. PCT/EP2020/069594, filed on Jul. 10, 2020, and of the German patent application No. 102019119023.1 filed on Jul. 12, 2019, the entire disclosures of which are incorporated herein by way of reference.

FIELD OF THE INVENTION

The invention relates to a wing for an aircraft, an aircraft, and a connecting assembly.

BACKGROUND OF THE INVENTION

Wings for aircrafts may comprise a main wing and several slats which are each connected to the main wing via a number of connecting assemblies such that the slats are each movable between a retracted position and at least one extended position. The slats may each be in a respective retracted position when the aircraft is on the ground or in normal flight. Further, during take-off of the aircraft, each slat may be in a respective first extended position of the at least one extended position and, during landing of the aircraft, each slat may be in a respective second extended position of the at least one extended position.

It has been shown that the positioning of the slats with respect to the main wing in the retracted position, the first extended position, and the second extended position are crucial in order to meet the aerodynamic requirements for the wing to achieve a resource efficient operation of an aircraft. Further, it is generally desirable to provide a lightweight wing to further increase the efficiency of the aircraft in operation.

SUMMARY OF THE INVENTION

An object of the present invention is to increase the efficiency of an aircraft in operation.

According to a first aspect of the present invention, the object is solved by a wing configured for an aircraft. The wing comprises a main wing, a slat, and a connecting assembly. The connecting assembly movably connects the slat to the main wing, such that the slat is movable between a retracted position and at least one extended position. The connecting assembly comprises an elongate slat track and a roller bearing. The slat track extends along a longitudinal axis of the slat track between a front section of the slat track and a rear section of the slat track. The slat track comprises an intermediate section between the front section and the rear section. The front section of the slat track is mounted to the slat. The rear section and the intermediate section of the slat track are mounted to the main wing via the roller bearing. The roller bearing comprises a guide rail mounted to the main wing and a first roller. The first roller is rotatably mounted to the rear section of the slat track. The first roller engages a first engagement surface formed by the guide rail such that the first roller rolls on the first engagement surface when the slat is moved between the retracted position and the at least one extended position. The roller bearing comprises a second roller. The second roller is rotatably mounted to the main wing. The second roller engages a second engagement surface formed by the intermediate section of the slat track such that the second roller rolls on the second engagement surface when the slat is moved between the retracted position and the at least one extended position. The slat track comprises a lower flange section, an upper flange section, and a web section connecting the upper flange section and the lower flange section. The second roller is arranged in a recess between the lower flange section and the upper flange section. The lower flange section, the upper flange section, the web section, and the recess each extend along the longitudinal axis of the slat track. The second engagement surface is formed by the upper flange section and/or the lower flange section. The first engagement surface comprises a first section. The first section is straight or is curved with a first radius of curvature and a first center of curvature. The second engagement surface comprises a second section. The second section is straight or is curved with a second radius of curvature and a second center of curvature. When both the first section and the second section are curved, the first center of curvature and the second center of curvature are spaced from each other.

The wing is configured for an aircraft such that the wing is mountable to a remaining section of the aircraft to form the aircraft. The wing comprises the main wing. The main wing may be configured to be mountable to a fuselage of an aircraft. The main wing may extend in a longitudinal direction of the main wing. In case the wing is mounted to a remaining section of the aircraft to form the aircraft, the longitudinal direction of the main wing points away from the fuselage of the aircraft. Preferably, the longitudinal direction of the main wing is oriented in parallel to a wing surface of the main wing and/or transversely to a flight direction of the aircraft in case the wing is mounted to a remaining section of the aircraft to form the aircraft.

The wing comprises the slat. The slat may provide an aerodynamic surface on the leading edge of the wing. The wing comprises the connecting assembly. The connecting assembly may be arranged entirely in front of a front spar of the main wing and does not penetrate the front spar.

The connecting assembly movably connects the slat to the main wing such that the slat is movable between the retracted position and the at least one extended position. The retracted position of the slat may correspond to a configuration of the wing when the aircraft is on ground or in normal flight. Preferably, the retracted position of the slat is the position of the slat in which the slat is arranged closest to the main wing. Further, a first extended position of the at least one extended position may correspond to a take-off configuration of the wing. In addition, a second extended position of the at least one extended position may correspond to a landing configuration of the wing. Preferably, the second extended position of the slat is the position of the slat in which the slat is arranged furthest away from the main wing. It is further preferred that in the first extended position of the slat, the slat is arranged between the retracted position and the second extended position of the slat. Preferably, the slat is movable from the retracted position to the first extended position and from the first extended position to the retracted position. Further, the slat is preferably movable from the retracted position to the second extended position and from the second extended position to the retracted position.

The connecting assembly comprises the elongate slat track. The slat track is elongate such that a longitudinal extension of the slat track is larger than a transverse extension of the slat track. The slat track comprises the front section, the intermediate section, and the rear section. The slat track extends along the longitudinal axis of the slat track between the front section of the slat track and the rear section of the slat track. The intermediate section is arranged between the front section and the rear section. The intermediate section may connect the front section with the rear section.

The front section of the slat track is mounted to the slat. Preferably, the front section of the slat track is fixedly mounted to the slat, e.g., by two spherical bearings. The rear section and the intermediate section of the slat track are mounted to the main wing via the roller bearing. In particular, the rear section and the intermediate section of the slat track are movably mounted to the main wing via the roller bearing such that the slat track is movable with respect to the main wing.

The connecting assembly comprises the roller bearing. The roller bearing comprises the guide rail and the first roller. The guide rail is mounted to the main wing and the first roller is rotatably mounted to the rear section of the slat track. The first roller engages the first engagement surface formed by the guide rail such that the first roller rolls on the first engagement surface when the slat is moved between the retracted position and the at least one extended position. The first engagement surface provides a running surface for the first roller to roll on when the slat is moved between the retracted position and the at least one extended position. The first engagement surface may be formed by an upper surface of the guide rail and/or by a lower surface of the guide rail. Preferably, the first engagement surface is formed by either the upper surface of the guide rail or by the lower surface of the guide rail or by both, the upper surface of the guide rail and the lower surface of the guide rail in a successive manner. The upper surface of the guide rail and the lower surface of the guide rail may face each other. It is preferred that a distance between the upper surface of the guide rail and the lower surface of the guide rail is larger than a diameter of the first roller, such that the first roller may engage only either the upper surface of the guide rail or the lower surface of the guide rail at the same time. The distance between the upper surface of the guide rail and the lower surface of the guide rail may be selected such that a clearance is provided between the first roller and either the upper surface of the guide rail or the lower surface of the guide rail, such that the first roller cannot engage with the upper surface of the guide rail and the lower surface of the guide rail at the same time and thereby block rotation of the first roller. It is further preferred that the first roller has a first axis of rotation extending in parallel to a wing span direction, to a leading edge of the main wing, and/or to a leading edge of the slat.

The roller bearing comprises the second roller. The second roller is rotatably mounted to the main wing. The second roller engages the second engagement surface formed by the intermediate section of the slat track such that the second roller rolls on the second engagement surface when the slat is moved between the retracted position and the at least one extended position. The second engagement surface provides a running surface for the second roller to roll on when the slat is moved between the retracted position and the at least one extended position.

The slat track comprises the lower flange section, the upper flange section, and the web section connecting the upper flange section and the lower flange section. The lower flange section, the upper flange section, and the web section may form a profile of a cross sectional area arranged perpendicular to the longitudinal axis of the slat track. The profile may be a C-profile, a double-C-profile, an I-profile, an H-profile, or a II-profile.

The second roller is arranged in the recess between the lower flange section and the upper flange section. The lower flange section, the upper flange section, the web section, and the recess each extend along the longitudinal axis of the slat track. The second engagement surface is formed by the upper flange section and/or the lower flange section. Preferably, the second engagement surface is formed by either the upper flange section or the lower flange section or both flange sections in a successive manner. Preferably, the second engagement surface faces the recess. The second engagement surface may be formed by an upper surface of the upper flange section and/or by a lower surface of the lower flange section. Preferably, the second engagement surface is formed by either the upper surface of the upper flange section or by the lower surface of the lower flange section or by both, the upper surface of the upper flange section and the lower surface of the lower flange section in a successive manner. The upper surface of the upper flange section and the lower surface of the lower flange section may face each other. It is preferred that a distance between the upper surface of the upper flange section and the lower surface of the lower flange section is larger than a diameter of the second roller, such that the second roller may engage only either the upper surface of the upper flange section or the lower surface of the lower flange section at the same time. The distance between the upper surface of the upper flange section and the lower surface of the lower flange section may be selected such that a clearance is provided between the second roller and either the upper surface of the upper flange section or the lower surface of the lower flange section, such that the second roller cannot engage with the upper surface of the upper flange section and the lower surface of the lower flange section at the same time and thereby block rotation of the second roller. It is further preferred that the second roller has a second axis of rotation extending in parallel to a wing span direction, to a leading edge of the main wing, and/or to a leading edge of the slat.

Due to this configuration of the wing, the second roller does not occupy the space above and below the slat track, and the slat track can be held with only a single roller element. This simplifies the connection assembly, saves space and weight, and thus increases efficiency of the wing. Further, the connecting assembly can be formed such that it is arranged entirely in front of the front spar of the main wing and does not penetrate the front spar.

The first engagement surface comprises a first section. The first section may extend along the first engagement surface from a first contact point between the first roller and the first engagement surface when the slat is in the retracted position to a second contact point between the first roller and the first engagement surface when the slat is in the second extended position. Alternatively, the first section may extend along the first engagement surface from the first contact point between the first roller and the first engagement surface when the slat is in the retracted position to a third contact point between the first roller and the first engagement surface when the slat is in the first extended position. In this case, the first engagement surface may comprise a third section, which is straight or is curved with a third radius of curvature and a third center of curvature. The third center of curvature and the first center of curvature may be spaced from each other. Further, the third center of curvature and the second center of curvature may be spaced from each other. The third section may extend along the first engagement surface from the second contact point between the first roller and the first engagement surface when the slat is in the second extended position to a third contact point between the first roller and the first engagement surface when the slat is in the first extended position.

The first section is straight or is curved with a first radius of curvature and a first center of curvature. In case the first section is straight, the straight first section can be thought of having a curvature with a first radius of curvature, which is infinitely large, and a first center of curvature, which is arranged in infinity. In case the first section is straight, the curvature of the first section can be thought of being zero. Therefore, even though the first section is straight, the first center of curvature and the second center of curvature can be thought of being still spaced from each other. In case the first section is curved, the first engagement surface may have a circular shape or an elliptic shape.

The second engagement surface comprises a second section. The second section may extend along the second engagement surface from a first contact point between the second roller and the second engagement surface when the slat is in the retracted position to a second contact point between the second roller and the second engagement surface when the slat is in the second extended position. Alternatively, the second section may extend along the second engagement surface from the first contact point between the second roller and the second engagement surface when the slat is in the retracted position to a third contact point between the second roller and the second engagement surface when the slat is in the first extended position. In this case, the second engagement surface may comprise a fourth section, which is straight or is curved with a fourth radius of curvature and a fourth center of curvature. The fourth center of curvature and the first center of curvature may be spaced from each other. Further, the fourth center of curvature and the second center of curvature may be spaced from each other. Additionally, the fourth center of curvature and the third center of curvature may be spaced from each other. The fourth section may extend along the second engagement surface from the second contact point between the second roller and the second engagement surface when the slat is in the second extended position to a third contact point between the second roller and the second engagement surface when the slat is in the first extended position.

The second section is straight or is curved with a second radius of curvature and a second center of curvature. In case the second section is straight, the straight second section can be thought of having a curvature with a second radius of curvature, which is infinitely large, and a second center of curvature, which is arranged in infinity. In case the second section is straight, the curvature of the second section can be thought of being zero. Therefore, even though the second section is straight, the second center of curvature and the first center of curvature can be thought of being still spaced from each other. Particularly, in case the first section is straight and the second section is straight, the first center of curvature and the second center of curvature can be thought of being spaced from each other. In case the second section is curved, the second engagement surface may have a circular shape or an elliptic shape.

When both the first section and the second section are curved, the first center of curvature and the second center of curvature are spaced from each other. Since the first center of curvature and the second center of curvature are spaced from each other, the first roller and the second roller are not restricted to movement around the same center of curvature when the first roller rolls on the first engagement surface and the second roller rolls on the second engagement surface when the slat is moved between the retracted position and the at least one extended position. Since the first roller and the second roller are not restricted to movement around the same center of curvature, the positioning of the slat with respect to the main wing can be set flexibly. Particularly, the positioning of the slat with respect to the main wing can be chosen dependent on the aerodynamic requirements for the wing to achieve a resource efficient operation of the aircraft. It is particularly preferred that the first engagement surface and the second engagement surface are shaped such that the slat is positioned with respect to the main wing in order for the wing to meet the aerodynamic requirements to achieve a resource efficient operation of the aircraft in the retracted position and in each of the at least one extended position.

In summary, the efficiency of an aircraft in operation is increased.

According to a preferred embodiment of the wing, the first section is curved with the first radius of curvature and the first center of curvature. In case the first section is curved with the first radius of curvature and the first center of curvature, a particularly preferred embodiment of the wing is provided.

According to a preferred embodiment of the wing, the second section is curved with the second radius of curvature and the second center of curvature. In case the second section is curved with the second radius of curvature and the second center of curvature, a particularly preferred embodiment of the wing is provided.

According to a preferred embodiment of the wing, the first radius of curvature and the second radius of curvature are the same. In case the first radius of curvature and the second radius of curvature are the same, a particularly preferred embodiment of the wing is provided.

According to a preferred embodiment of the wing, the first radius of curvature is larger than the second radius of curvature. In case the first radius of curvature is larger than the second radius of curvature, a particularly preferred embodiment of the wing is provided.

According to a preferred embodiment of the wing, the first radius of curvature is smaller than the second radius of curvature. In case the first radius of curvature is smaller than the second radius of curvature, a particularly preferred embodiment of the wing is provided.

According to a preferred embodiment of the wing, the first section is straight. In case the first section is straight, a particularly preferred embodiment of the wing is provided.

According to a preferred embodiment of the wing, the second section is straight. In case the second section is straight, a particularly preferred embodiment of the wing is provided.

According to a preferred embodiment of the wing, the first section and the second section extend transversely to each other. In case the first section and the second section extend transversely to each other, a particularly preferred embodiment of the wing is provided.

According to a preferred embodiment of the wing, the first engagement surface comprises a third section, which is straight or is curved with a third radius of curvature and a third center of curvature, wherein, when the third section and the first section are curved, the third center of curvature and the first center of curvature are spaced from each other, and when the third section and the second section are curved, the third center of curvature and the second center of curvature are spaced from each other. In case the first engagement surface comprises the third section, the first engagement surface comprises the first section and the third section, which differ in their shapes. Since the first section and the third section differ in their shapes the flexibility of the positioning of the slat with respect to the main wing can be further increased. Similarly to the third section, the first engagement surface may comprise at least one further first section, wherein each of the at least one further first section may be straight or curved with a respective radius of curvature and a respective center of curvature. Therefore, the flexibility of the positioning of the slat with respect to the main wing can be further increased. The features, technical effects and/or advantages described in connection with the first section, the second section, and the third section also apply to each of the at least one further first section at least in an analogous manner, so that no corresponding repetition is made here.

According to a preferred embodiment of the wing, the second engagement surface comprises a fourth section, which is straight or is curved with a fourth radius of curvature and a fourth center of curvature, wherein, when the fourth section and the first section are curved, the fourth center of curvature and the first center of curvature are spaced from each other, and, when the fourth section and the second section are curved, the fourth center of curvature and the second center of curvature are spaced from each other, and, when the fourth section and the third section are curved, the fourth center of curvature and the third center of curvature are spaced from each other. In case the second engagement surface comprises the fourth section, the second engagement surface comprises the second section and the fourth section, which differ in their shapes. Since the second section and the fourth section differ in their shapes the flexibility of the positioning of the slat with respect to the main wing can be further increased. Similarly to the fourth section, the second engagement surface may comprise at least one further second section, wherein each of the at least one further second section may be straight or curved with a respective radius of curvature and a respective center of curvature. Therefore, the flexibility of the positioning of the slat with respect to the main wing can be further increased. The features, technical effects and/or advantages described in connection with the first section, the second section, the third section, and the fourth section also apply to each of the at least one further second section at least in an analogous manner, so that no corresponding repetition is made here.

Preferably, the wing comprises an actuation unit, which is configured to drive movement of the slat between the retracted position and the at least one extended position, i.e., from the retracted position to the at least one extended position and from the at least one extended position to the retracted position. The actuation unit may comprise a first section and a second section. The first section may be mountable to the slat track. The second section may be mountable to the main wing. The actuation unit may be configured to move the first section with respect to the second section to drive movement of the slat between the retracted position and the at least one extended position. Further, the actuation unit may comprise a rack and a pinion. The rack may be mounted to the lower flange section and the pinion may be rotatably mounted to the main wing. When the pinion is rotatably mounted to the main wing, the rack and the pinion may meshingly engage with each other. The actuation unit may be configured to drive rotation of the pinion to drive movement of the rack to drive movement of the slat between the retracted position and the at least one extended position. The rack may extend in parallel to the first section and may be straight. Further, the rack may have a non-straight and non-circular line of action. Further, the rack may be curved with a center of curvature being equal to the second center of curvature, particularly when the second section is curved. The actuation unit may be powered electrically and/or hydraulically and/or pneumatically.

According to a second aspect of the present invention, the object is also solved by an aircraft comprising a wing according to an embodiment of the first aspect of the present invention. The features, technical effects and/or advantages described in connection with the first aspect of the present invention also apply to the second aspect of the present invention at least in an analogous manner, so that no corresponding repetition is made here.

According to a third aspect of the present invention, the object is also solved by a connecting assembly configured to movably connect a slat to a main wing, such that the slat is movable between a retracted position and at least one extended position. The connecting assembly comprises an elongate slat track and a roller bearing. The slat track extends along a longitudinal axis of the slat track between a front section of the slat track and a rear section of the slat track. The slat track comprises an intermediate section between the front section and the rear section. The front section of the slat track is mountable to the slat. The rear section and the intermediate section of the slat track are mountable to the main wing via the roller bearing. The roller bearing comprises a guide rail mountable to the main wing and a first roller. The first roller is rotatably mounted to the rear section of the slat track. The first roller engages a first engagement surface formed by the guide rail such that the first roller rolls on the first engagement surface when the slat is moved between the retracted position and the at least one extended position. The roller bearing comprises a second roller. The second roller is rotatably mountable to the main wing. The second roller engages a second engagement surface formed by the intermediate section of the slat track such that the second roller rolls on the second engagement surface when the slat is moved between the retracted position and the at least one extended position. The slat track comprises a lower flange section, an upper flange section, and a web section connecting the upper flange section and the lower flange section. The second roller is arranged in a recess between the lower flange section and the upper flange section. The lower flange section, the upper flange section, the web section, and the recess each extend along the longitudinal axis of the slat track. The second engagement surface is formed by the upper flange section and/or the lower flange section. The first engagement surface comprises a first section. The first section is straight or is curved with a first radius of curvature and a first center of curvature. The second engagement surface comprises a second section. The second section is straight or is curved with a second radius of curvature and a second center of curvature. When both the first section and the second section are curved, the first center of curvature and the second center of curvature are spaced from each other. The features, technical effects and/or advantages described in connection with the first aspect of the present invention and the second aspect of the present invention also apply to the third aspect of the present invention at least in an analogous manner, so that no corresponding repetition is made here.

BRIEF DESCRIPTION OF THE DRAWINGS

Further features, advantages and application possibilities of the present invention may be derived from the following description of exemplary embodiments and/or the figures.

Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

DETAILED DESCRIPTION OF THE PREFERRED EMBODIMENTS

Figure 1:
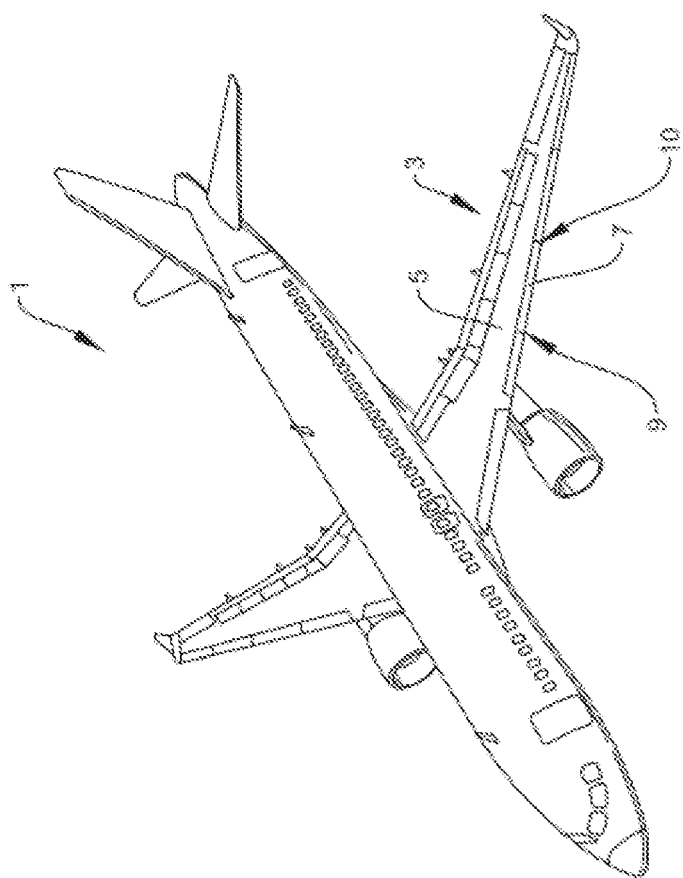
FIG. 1 schematically illustrates in a perspective view an embodiment of an aircraft comprising a wing.

FIG. 1 schematically illustrates, in a perspective view, an embodiment of an aircraft 1 comprising a wing 3. The wing 3 comprises a main wing 5, a slat 7, and a connecting assembly 9. The connecting assembly 9 movably connects the slat 7 to the main wing 5, such that the slat 7 is movable between a retracted position and at least one extended position. In addition to the connecting assembly 9, FIG. 1 shows a further connecting assembly 10, which also movably connects the slat 7 to the main wing 5, such that the slat 7 is movable between the retracted position and the at least one extended position. The further connecting assembly 10 is formed as the connecting assembly 9.

Figure 2:
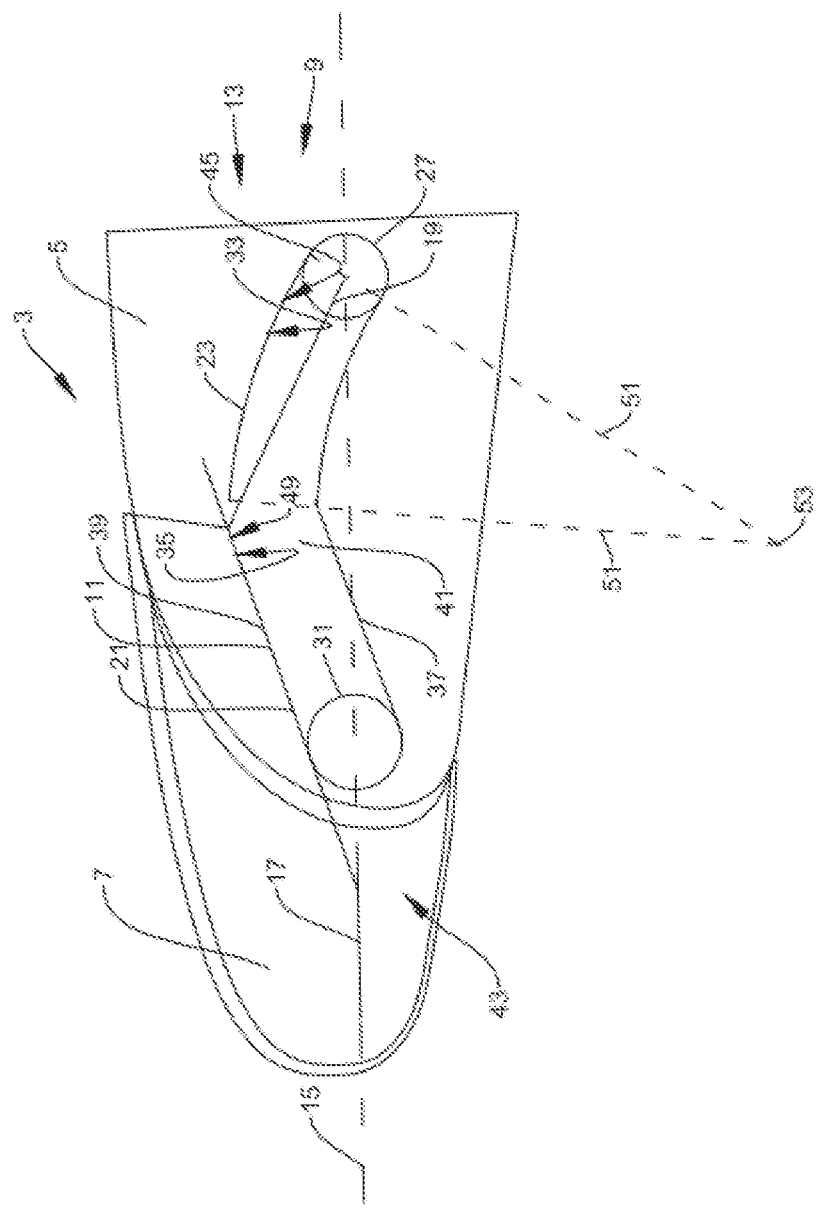
FIG. 2 schematically illustrates in a cross sectional view a section of a first embodiment of the wing shown in FIG. 1, wherein a slat of the wing is shown in a retracted position.
Figure 3:
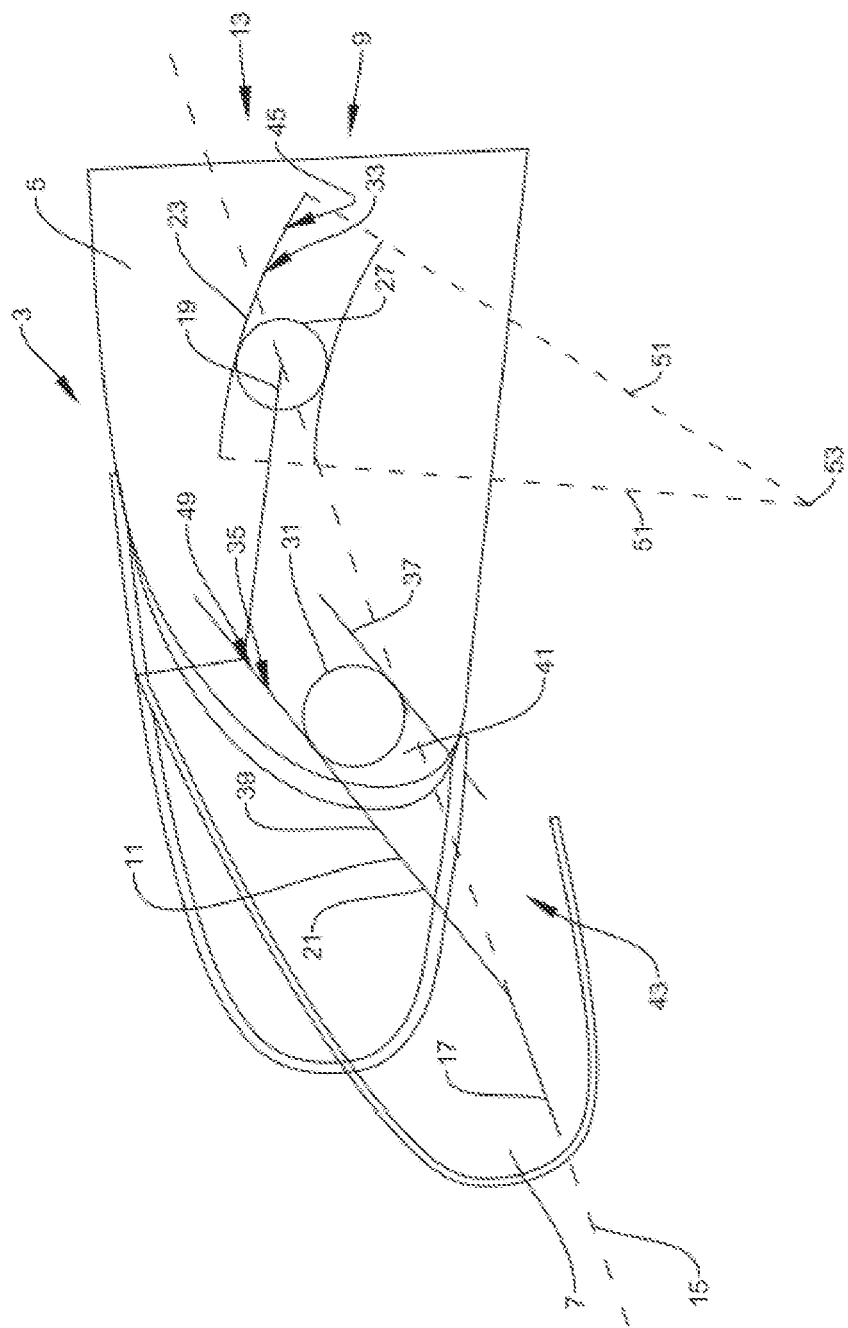
FIG. 3 schematically illustrates in a cross sectional view the section of the first embodiment of the wing shown in FIG. 1, wherein the slat of the wing is shown in a first extended position of at least one extended position.
Figure 4:
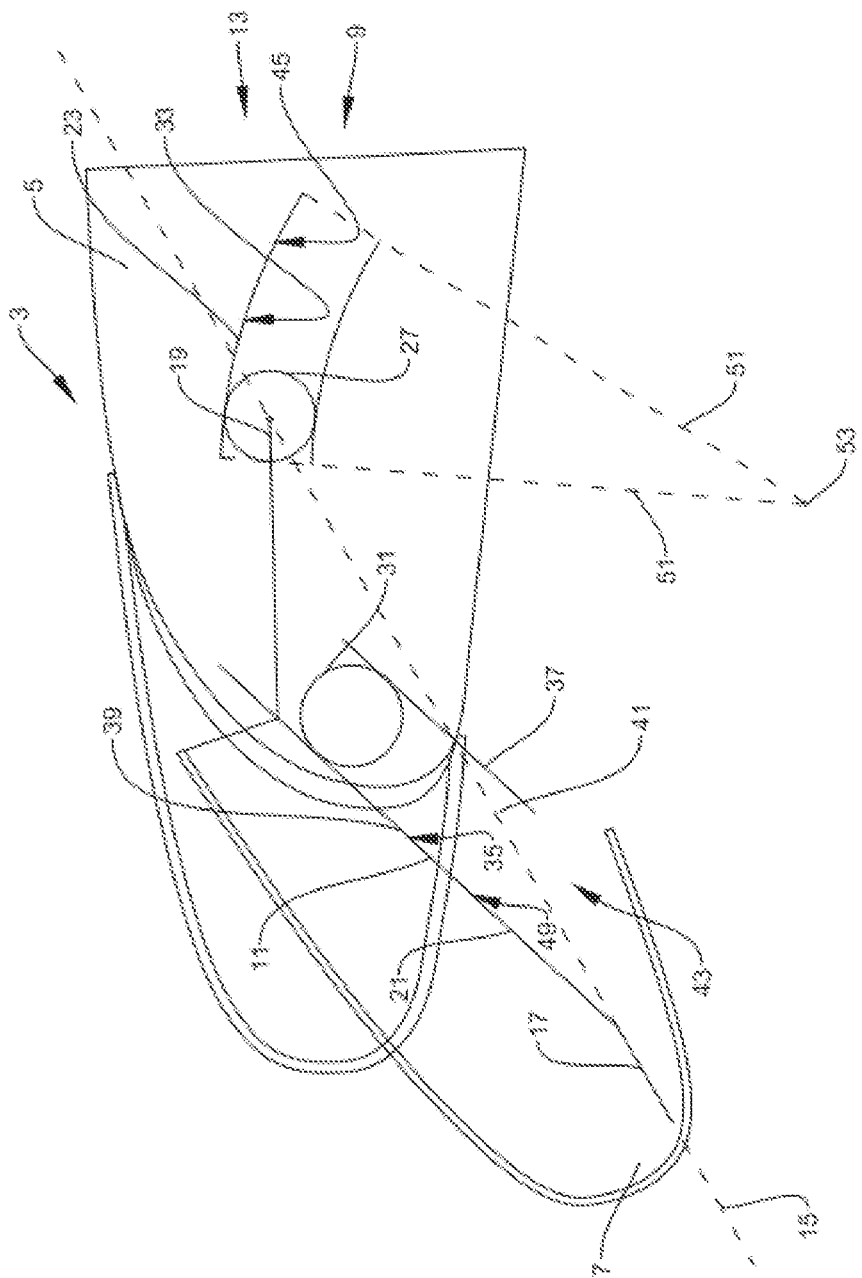
FIG. 4 schematically illustrates in a cross sectional view the section of the first embodiment of the wing shown in FIG. 1, wherein the slat of the wing is shown in a second extended position of the at least one extended position.

FIGS. 2, 3, and 4 schematically illustrate in a cross sectional view a section of a first embodiment of the wing 3 shown in FIG. 1. FIG. 2 shows the slat 7 of the wing 3 in the retracted position, FIG. 3 shows the slat 7 of the wing 3 in a first extended position of the at least one extended position, and FIG. 4 shows the slat 7 of the wing 3 in a second extended position of the at least one extended position. For illustration reasons, FIGS. 3 and 4 also show the slat 7 in the retracted position of FIG. 2.

The connecting assembly 9 comprises an elongate slat track 11 and a roller bearing 13. The slat track 11 extends along a longitudinal axis 15 of the slat track 11 between a front section 17 of the slat track 11 and a rear section 19 of the slat track 11. Even though the longitudinal axis 15 of the slat track 11 is displayed as a straight line in the Figures, the longitudinal axis 15 of the slat track 11 can be thought of following the shape of the slat track 11 from the front section 17 and to the rear section 19, particularly at least sectionally in a curved and/or straight manner. The slat track 11 comprises an intermediate section 21 between the front section 17 and the rear section 19. The front section 17 of the slat track 11 is fixedly mounted to the slat 7. The rear section 19 and the intermediate section 21 of the slat track 11 are mounted to the main wing 5 via the roller bearing 13.

The roller bearing 13 comprises a guide rail 23, a first roller 27, and a second roller 31. The guide rail 23 is fixedly mounted to the main wing 5. The first roller 27 is rotatably mounted to the rear section 19 of the slat track 11. The guide rail 23 forms a first engagement surface 33. The first roller 27 engages the first engagement surface 33 such that the first roller 27 rolls on the first engagement surface 33 when the slat 7 is moved between the retracted position and the at least one extended position. The second roller 31 is rotatably mounted to the main wing 5. The intermediate section 21 of the slat track 11 forms a second engagement surface 35. The second roller 31 engages the second engagement surface 35 such that the second roller 31 rolls on the second engagement surface 35 when the slat 7 is moved between the retracted position and the at least one extended position.

The slat track 11 comprises a lower flange section 37, an upper flange section 39, and a web section 41. The web section 41 is arranged between the lower flange section 37 and the upper flange section 39 and connects the upper flange section 39 and the lower flange section 37. The second roller 31 is arranged in a recess 43 between the lower flange section 37 and the upper flange section 39. The second engagement surface 35 faces the recess 43. The lower flange section 37, the upper flange section 39, the web section 41, and the recess 43 each extend along the longitudinal axis 15 of the slat track 11. The second engagement surface 35 is formed by the upper flange section 39 and/or the lower flange section 37.

The first engagement surface 33 comprises a first section 45. The first section 45 of the first engagement surface 33 extends along the first engagement surface 33 from a first contact point between the first roller 27 and the first engagement surface 33 when the slat 7 is in the retracted position to a second contact point between the first roller 27 and the first engagement surface 33 when the slat 7 is in the second extended position shown in FIG. 4.

The second engagement surface 35 comprises a second section 49. The second section 49 extends along the second engagement surface 35 from a first contact point between the second roller 31 and the second engagement surface 35 when the slat 7 is in the retracted position to a second contact point between the second roller 31 and the second engagement surface 35 when the slat 7 is in the second extended position shown in FIG. 4.

In the first embodiment of the wing 3 shown in FIGS. 2, 3, and 4, the first section 45 is curved with a first radius of curvature 51 and a first center of curvature 53 and the second section 49 is straight. The straight second section 49 can be thought of having a curvature with a second radius of curvature 55, which is infinitely large, and a second center of curvature, which is arranged in infinity Therefore, even though the second section 49 is straight, the first center of curvature 53 and the second center of curvature are still spaced from each other. Further, the first radius of curvature 51 can be thought of being smaller than the second radius of curvature 55.

Figure 5:
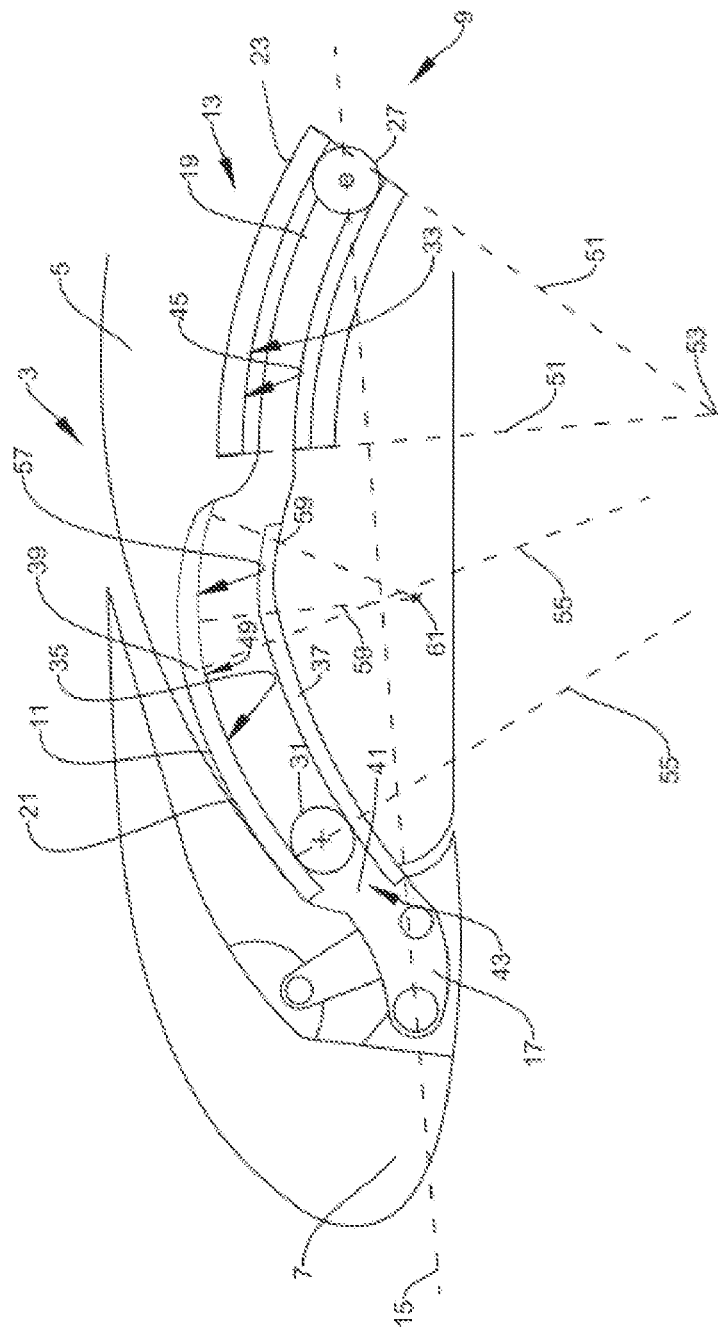
FIG. 5 schematically illustrates in a cross sectional view a section of a second embodiment of the wing shown in FIG. 1, wherein a slat of the wing is shown in a retracted position.

FIG. 5 schematically illustrates in a cross sectional view a section of a second embodiment of the wing 3 shown in FIG. 1, wherein a slat 7 of the wing 3 is shown in a retracted position. The first section 45 of the first engagement surface 33 is curved with the first radius of curvature 51 and the first center of curvature 53. Even though the first section 45 of the first engagement surface 33 is curved in the second embodiment shown in FIG. 5, the first section 45 of the first engagement surface 33 can be straight in a further embodiment. The first section 45 of the first engagement surface 33 extends along the first engagement surface 33 from the first contact point between the first roller 27 and the first engagement surface 33 when the slat 7 is in the retracted position as shown in FIG. 5 to a second contact point between the first roller 27 and the first engagement surface 33 when the slat 7 is in the second extended position, which is similar to the second extended position of the first embodiment shown in FIG. 4. The second section 49 of the second engagement surface 35 is curved with the second radius of curvature 55 and a second center of curvature, which is not shown in FIG. 5. Therefore, both the first section 45 of the first engagement surface 33 and the second section 49 of the second engagement surface 35 are curved, and the first center of curvature 53 and the second center of curvature are spaced from each other. Even though the second section 49 of the second engagement surface 35 is curved in the second embodiment shown in FIG. 5, the second section 49 of the second engagement surface 35 can be straight. In case the first section 45 of the first engagement surface 33 and the second section 49 of the second engagement surface 35 are straight, the first section 45 of the first engagement surface 33 and the second section 49 of the second engagement surface 35 can extend transversely to each other.

In the second embodiment shown in FIG. 5, the first radius of curvature 51 is smaller than the second radius of curvature 55. Further, in a further embodiment, the first radius of curvature 51 and the second radius of curvature 55 can be the same. Alternatively, the first radius of curvature 51 can be larger than the second radius of curvature 55.

The second engagement surface 35 comprises a fourth section 57, which is curved with a fourth radius of curvature 59 and a fourth center of curvature 61. Therefore, the first section 45 first engagement surface 33, the second section 49 of the second engagement surface 35, and the fourth section 57 are curved. The fourth center of curvature 61 and the first center of curvature 53 are spaced from each other. Further, the fourth center of curvature 61 and the second center of curvature, which is not shown in FIG. 5, are spaced from each other. Similarly, in a further embodiment, the first engagement surface 33 may comprise a third section, which is straight or is curved with a third radius of curvature and a third center of curvature. The third center of curvature and the first center of curvature 53, the third center of curvature and the second center of curvature, and the third center of curvature and the fourth center of curvature 61 may be spaced from each other.

Figure 6:
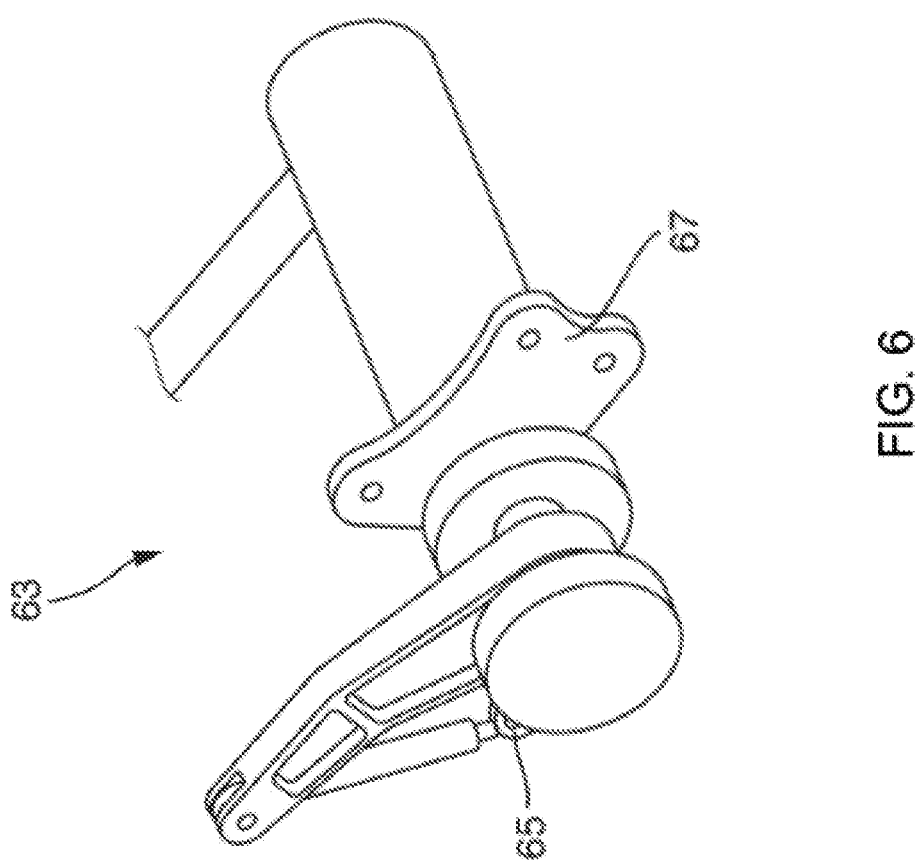
FIG. 6 schematically illustrates in a perspective view an embodiment of an actuation unit of the wing according to the first embodiment and the second embodiment.

FIG. 6 schematically illustrates in a perspective view an embodiment of an actuation unit 63 of the wing 3 according to the first embodiment and the second embodiment. The actuation unit 63 comprises a first section 65 and a second section 67. The first section 65 of the actuation unit 63 is mountable to the slat track 11 of the first and second embodiment. The second section 67 of the actuation unit 63 is mountable to the main wing 5 of the first and second embodiment. The actuation unit 63 is configured to move the first section 65 of the actuation unit 63 with respect to the second section 67 of the actuation unit 63 to drive movement of the slat 7 between the retracted position and the at least one extended position.

Figure 7:
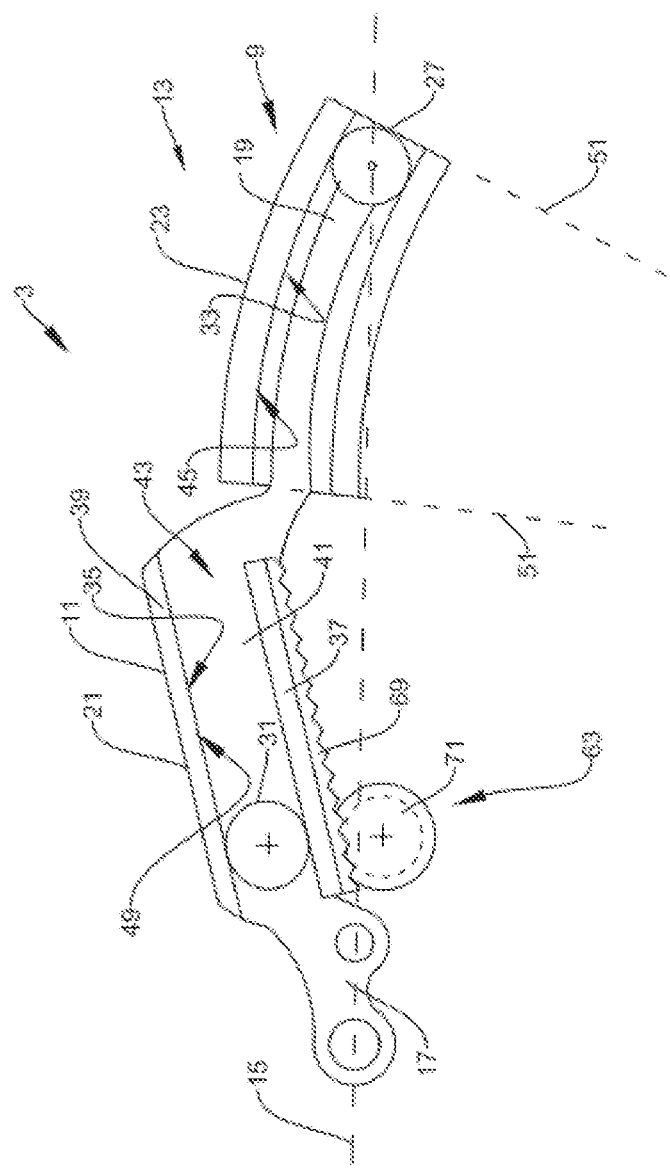
FIG. 7 schematically illustrates in a cross sectional view a section of a third embodiment of the wing shown in FIG. 1, wherein the wing is in a first configuration, in which the slat of the wing is in the retracted position.
Figure 8:
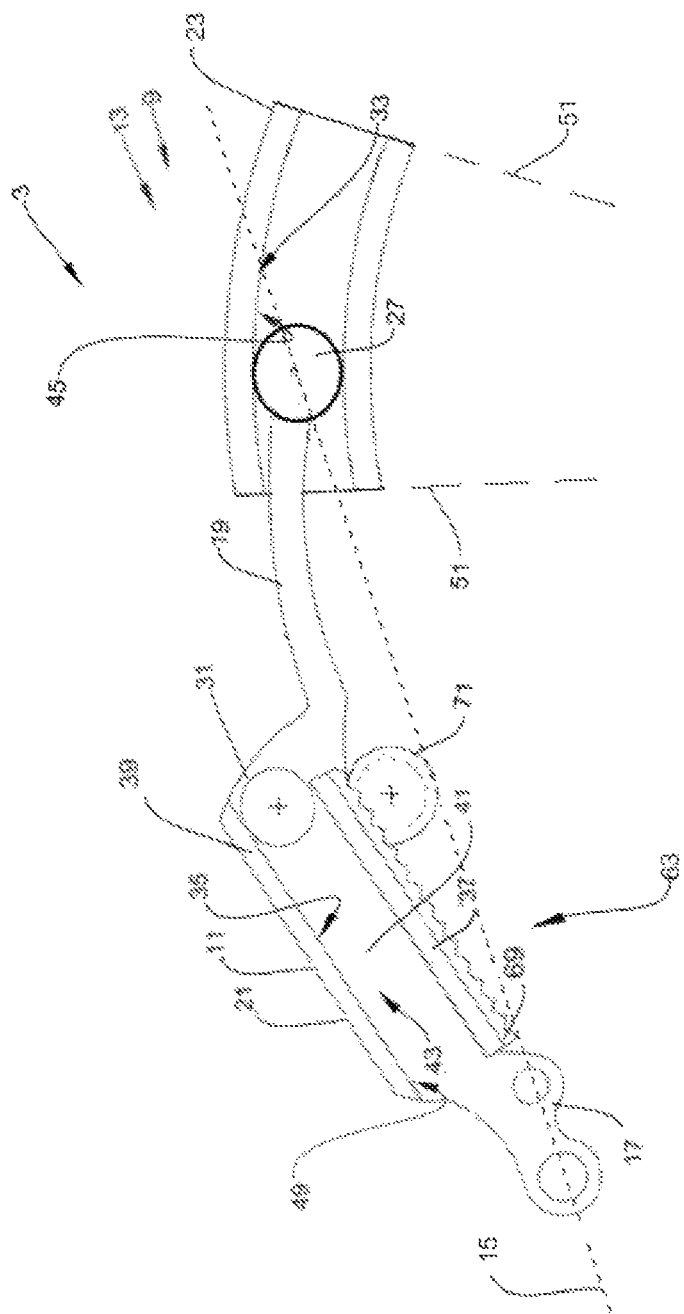
FIG. 8 schematically illustrates in a cross sectional view the section of the third embodiment of the wing shown in FIG. 1, wherein the wing is in a second configuration, in which the slat of the wing is in the second extended position of the at least one extended position.

FIG. 7 and FIG. 8 each schematically illustrate in a cross sectional view a section of a third embodiment of the wing 3 shown in FIG. 1. FIG. 7 shows a first configuration of the wing 3 and FIG. 8 shows a second configuration of the wing 3. In the first configuration of the wing 3, the slat 7 of the wing 3 is in the retracted position. In the second configuration of the wing 3, the slat 7 of the wing 3 is in the second extended position of the at least one extended position. The first section 45 of the first engagement surface 33 is curved with the first radius of curvature 51 and a first center of curvature 53, which is not displayed in FIG. 7 and FIG. 8. The second section 49 of the second engagement surface 35 is straight. The first section 45 of the first engagement surface 33 extends along the first engagement surface 33 from a first contact point between the first roller 27 and the first engagement surface 33 when the slat 7 is in the retracted position shown in FIG. 7 to a second contact point between the first roller 27 and the first engagement surface 33 when the slat 7 is in the second extended position shown in FIG. 8. The second section 49 of the second engagement surface 35 extends along the second engagement surface 35 from a third contact point between the second roller 31 and the second engagement surface 35 when the slat 7 is in the retracted position as shown in FIG. 7 to a fourth contact point between the second roller 31 and the second engagement surface 35 when the slat 7 is in the second extended position shown in FIG. 8.

FIG. 7 and FIG. 8 show the actuation unit 63 of the wing 3 according to the third embodiment. The actuation unit 63 comprises a rack 69 and a pinion 71. The rack 69 is mounted to the lower flange section 37 and the pinion 71 is rotatably mountable to the main wing 5. When the pinion 71 is rotatably mounted to the main wing 5, the rack 69 and the pinion 71 meshingly engage with each other. The actuation unit 63 is configured to drive rotation of the pinion 71 to drive movement of the rack 69 to drive movement of the slat 7 between the retracted position and the at least one extended position. Even though the rack 69 extends in parallel to the first section 45 of the first engagement surface 33 and is straight, the rack 69 may have a non-straight and non-circular line of action. Further, the rack 69 may be curved with a center of curvature being equal to the second center of curvature, in case the second section 49 of the second engagement surface 35 is curved.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A wing for an aircraft, comprising
a main wing,
a slat, and
a connecting assembly movably connecting the slat to the main wing, such that the slat is movable between a retracted position and at least one extended position,
wherein the connecting assembly comprises an elongate slat track and a roller bearing,
wherein the slat track extends along a longitudinal axis of the slat track between a front section of the slat track and a rear section of the slat track,
wherein the slat track comprises an intermediate section between the front section and the rear section,
wherein the front section of the slat track is mounted to the slat,
wherein the rear section and the intermediate section of the slat track are movably joined to the main wing via the roller bearing,
wherein the roller bearing comprises a guide rail mounted to the main wing and a first roller,
wherein the first roller is rotatably attached to the rear section of the slat track such that longitudinal displacement by the slat track imparts longitudinal displacement by the first roller in relation to the guide rail,
wherein the first roller engages a first engagement surface formed by the guide rail such that the first roller rolls on the first engagement surface when the slat is moved between the retracted position and the at least one extended position,
wherein the roller bearing comprises a second roller,
wherein the second roller is rotatably mounted to the main wing,
wherein the second roller engages a second engagement surface formed by the intermediate section of the slat track such that the second roller rolls on the second engagement surface when the slat is moved between the retracted position and the at least one extended position,
wherein the slat track comprises a lower flange section, an upper flange section, and a web section connecting the upper flange section and the lower flange section,
wherein the second roller is arranged in a recess between the lower flange section and the upper flange section,
wherein the lower flange section, the upper flange section, the web section, and the recess each extend along the longitudinal axis of the slat track,
wherein the second engagement surface is formed by at least one of the upper flange section or the lower flange section,
wherein the first engagement surface comprises a first section, which is straight or is curved with a first radius of curvature and a first center of curvature, and the second engagement surface comprises a second section, which is straight or is curved with a second radius of curvature and a second center of curvature, wherein, when both the first section and the second section are curved, the first center of curvature and the second center of curvature are spaced from each other.
2. The wing according to claim 1, wherein the first section is curved with the first radius of curvature and the first center of curvature.
3. The wing according to claim 1, wherein the second section is curved with the second radius of curvature and the second center of curvature.
4. The wing according to claim 1,
wherein the first section is curved with the first radius of curvature and the first center of curvature,
wherein the second section is curved with the second radius of curvature and the second center of curvature, and
wherein the first radius of curvature and the second radius of curvature are the same.
5. The wing according to claim 1,
wherein the first section is curved with the first radius of curvature and the first center of curvature,
wherein the second section is curved with the second radius of curvature and the second center of curvature, and
wherein the first radius of curvature is larger than the second radius of curvature.
6. The wing according to claim 1,
wherein the first section is curved with the first radius of curvature and the first center of curvature,
wherein the second section is curved with the second radius of curvature and the second center of curvature, and
wherein the first radius of curvature is smaller than the second radius of curvature.
7. The wing according to claim 1, wherein the first engagement surface comprises a third section, which is straight or is curved with a third radius of curvature and a third center of curvature, wherein, when the third section and the first section are curved, the third center of curvature and the first center of curvature are spaced from each other, and when the third section and the second section are curved, the third center of curvature and the second center of curvature are spaced from each other.
8. The wing according to claim 7, wherein the second engagement surface comprises a fourth section, which is straight or is curved with a fourth radius of curvature and a fourth center of curvature, wherein, when the fourth section and the first section are curved, the fourth center of curvature and the first center of curvature are spaced from each other, and, when the fourth section and the second section are curved, the fourth center of curvature and the second center of curvature are spaced from each other, and, when the fourth section and the third section are curved, the fourth center of curvature and the third center of curvature are spaced from each other.
9. An aircraft comprising a wing according to claim 1.
10. A connecting assembly configured to movably connect a slat to a main wing, such that the slat is movable between a retracted position and at least one extended position,
wherein the connecting assembly comprises an elongate slat track and a roller bearing,
wherein the slat track extends along a longitudinal axis of the slat track between a front section of the slat track and a rear section of the slat track,
wherein the slat track comprises an intermediate section between the front section and the rear section,
wherein the front section of the slat track is mountable to the slat,
wherein the rear section and the intermediate section of the slat track are mountable to the main wing via the roller bearing,
wherein the roller bearing comprises a guide rail mountable to the main wing and a first roller,
wherein the first roller is rotatably attached to the rear section of the slat track such that longitudinal displace- ment by the slat track imparts longitudinal displacement by the first roller in relation to the guide rail, wherein the first roller engages a first engagement surface formed by the guide rail such that the first roller rolls on the first engagement surface when the slat is moved between the retracted position and the at least one extended position, wherein the roller bearing comprises a second roller, wherein the second roller is rotatably mountable to the main wing, wherein the second roller engages a second engagement surface formed by the intermediate section of the slat track such that the second roller rolls on the second engagement surface when the slat is moved between the retracted position and the at least one extended position, wherein the slat track comprises a lower flange section, an upper flange section, and a web section connecting the upper flange section and the lower flange section, wherein the second roller is arranged in a recess between the lower flange section and the upper flange section, wherein the lower flange section, the upper flange section, the web section, and the recess each extend along the longitudinal axis of the slat track, wherein the second engagement surface is formed by at least one of the upper flange section or the lower flange section, wherein the first engagement surface comprises a first section, which is straight or is curved with a first radius of curvature and a first center of curvature, and the second engagement surface comprises a second section, which is straight or is curved with a second radius of curvature and a second center of curvature, wherein, when both the first section and the second section are curved, the first center of curvature and the second center of curvature are spaced from each other.

* * * * *